W. T. MOORE.
MEANS FOR LASHING PACKS ON ANIMALS.
APPLICATION FILED NOV. 17, 1908.
982,975.
Patented Jan. 31, 1911.
2 SHEETS—SHEET 1.
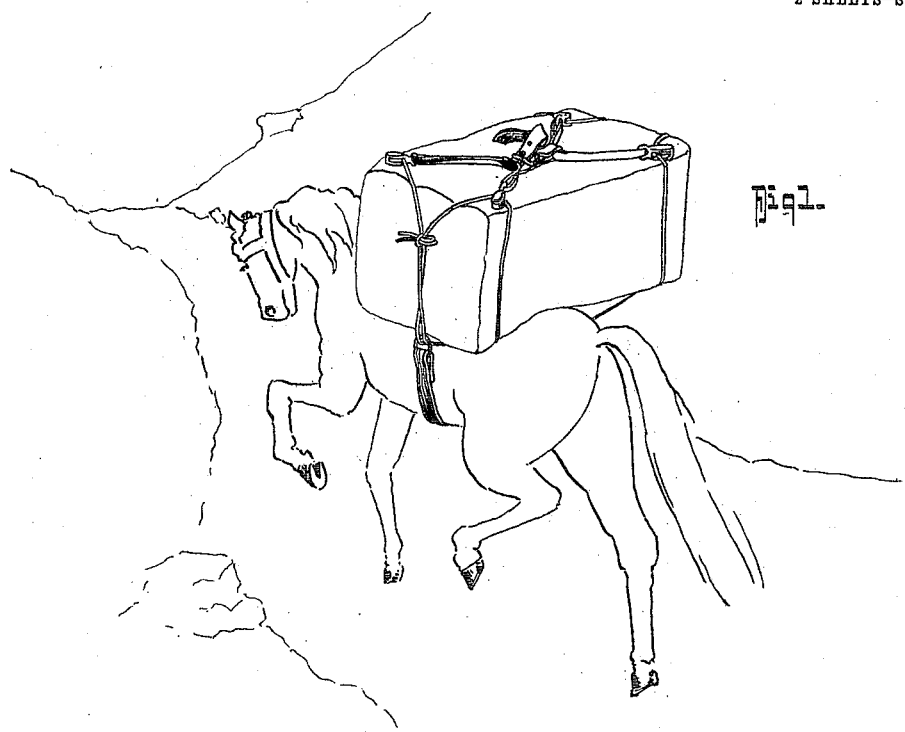
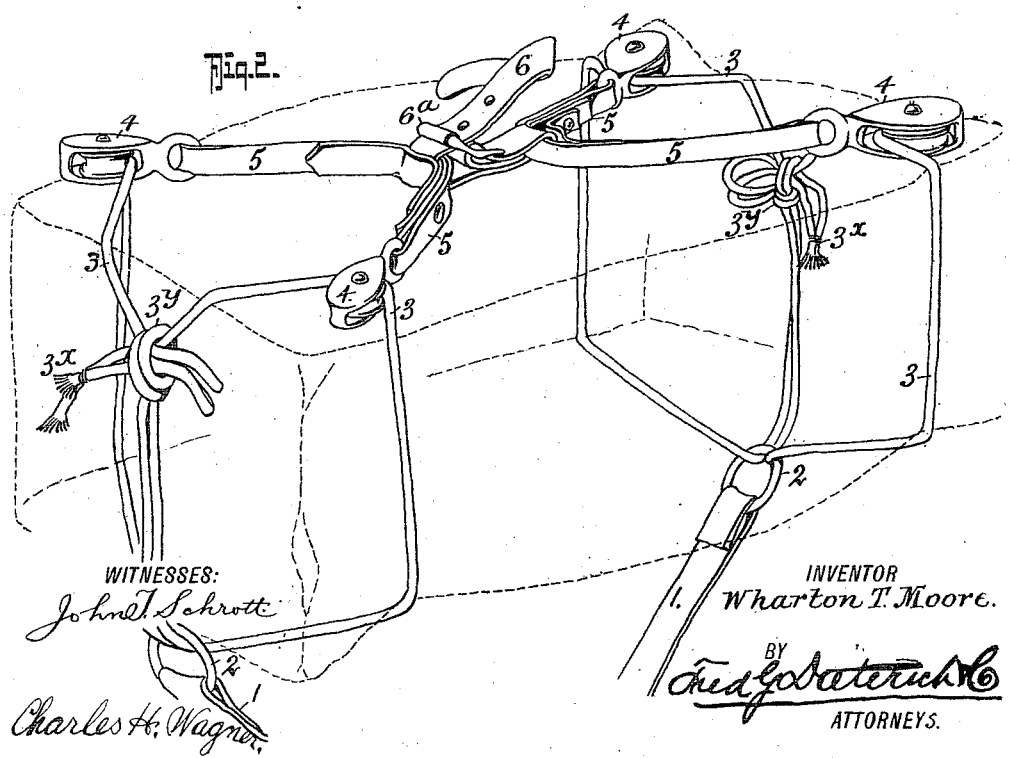
WITNESSES:
John T. Schrott
Charles H. Wagner
INVENTOR
Wharton T. Moore.
BY
Fred Gobaterich
ATTORNEYS.

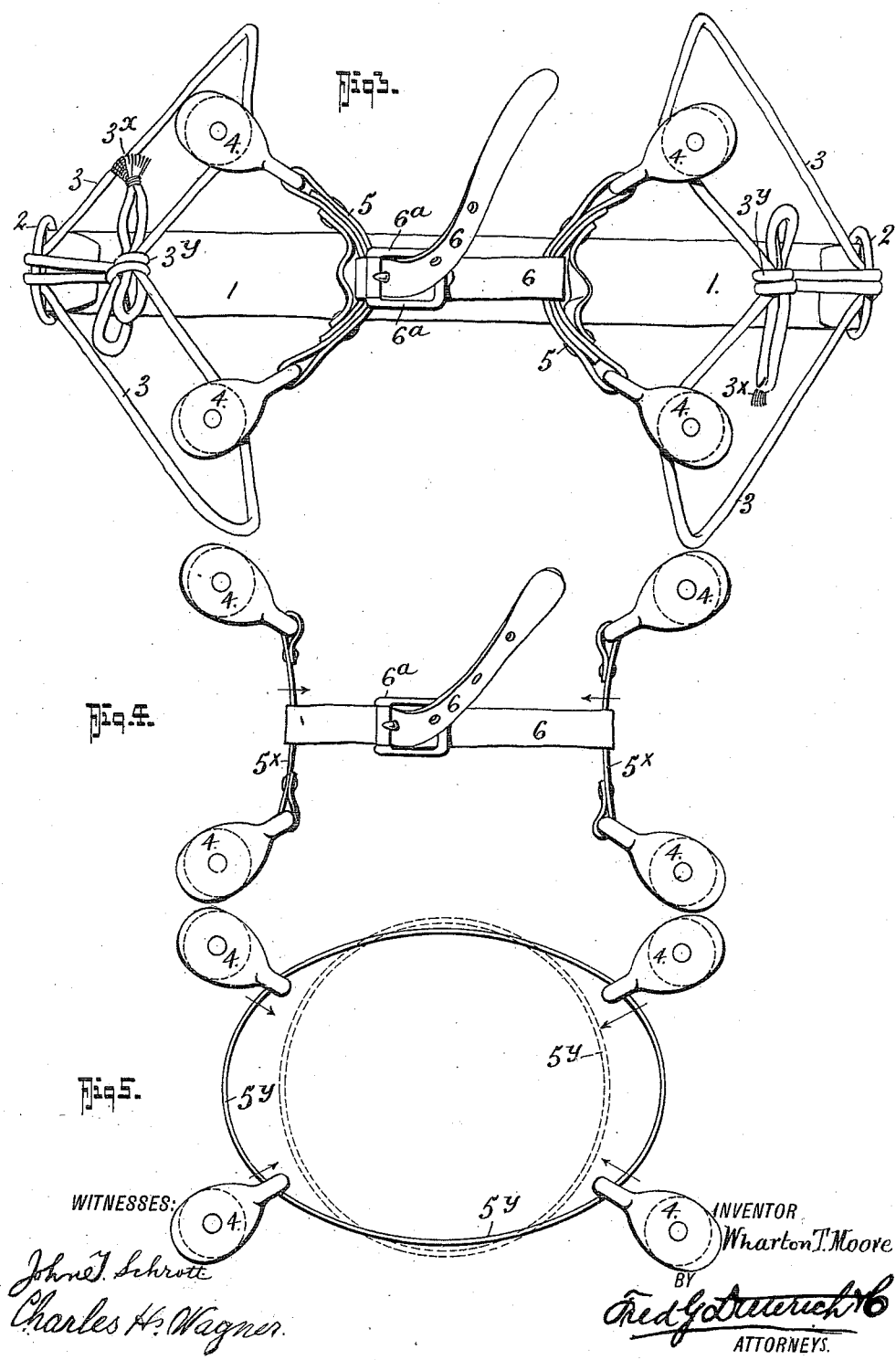

UNITED STATES PATENT OFFICE.

WHARTON T. MOORE, OF CENTRAL POINT, OREGON.

MEANS FOR LASHING PACKS ON ANIMALS.

982,975.  Specification of Letters Patent.  Patented Jan. 31, 1911.

Application filed November 17, 1908. Serial No. 463,061.

*To all whom it may concern:*

Be it known that I, WHARTON T. MOORE, residing at Central Point, in the county of Jackson and State of Oregon, have invented certain new and useful Improvements in Means for Lashing Packs on Animals, of which the following is a specification.

My invention relates to a certain new and useful improvement in apparatus for lashing or securing packs on animals, and it particularly seeks to provide an apparatus of this character of a simple and effective construction, which can be quickly applied and which may be readily tightened up when required by an attendant without such attendant finding it necessary to stop the movement of the pack-horse or himself alighting from the horse he is riding.

My invention also seeks to provide an apparatus of the foregoing character which can be easily and cheaply manufactured and which will readily serve its intended purposes.

In its generic nature the invention embodies a band which passes beneath the belly of the animal and to which pack securing ropes are attached, the ropes in turn passing over a tightening mechanism on the top of the pack.

In its more detail nature, my invention embodies those novel details of construction, combination and arrangement of parts, all of which will be first described in detail and then be specifically pointed out in the appended claims, reference being had to the accompanying drawings, in which:—

Figure 1, is a perspective view showing my invention applied for use. Fig. 2, is a perspective view of the apparatus, the pack being indicated in dotted lines. Fig. 3, is a diagrammatic view of my invention. Fig. 4, is a detail view of a slightly modified form thereof. Fig. 5, is a similar view of a further modification.

Referring now to the accompanying drawings, in which like letters and numerals of reference indicate like parts in all of the figures, 1 designates the belly-band or strap to the ends of which rings 2 are secured.

3 designates the tie ropes which pass through the rings 2 and through sheaves 4 that form a part of the tightening mechanism. The tightening mechanism in the form of my invention shown in Figs. 1 and 2 consists of four pulleys or sheaves 4 secured together in pairs by straps 5, which straps 5 are in turn secured together by another strap 6 that carries a buckle 6ª, as shown. When the pack has been lashed on the animal, as shown in Fig. 1, the same may be tightened from time to time, by simply tightening the strap 6, thus drawing the straps 5 toward one another, and shortening the distance between the two sets of sheaves 4—4. In order to quickly release the pack from the animal it is only necessary to pull the ends 3ˣ of the ropes 3 when the knot 3ʸ will come untied and release the pack.

Instead of connecting the sets of pulleys or sheaves 4 by a strap 5, as shown in Fig. 1, they may be connected by a metallic band 5ˣ, as shown in Fig. 4, or all of the sheaves 4 may be connected by a closed metallic band or ring 5ʸ, as shown in Fig. 5, and when this form of my invention is used, the tightening strap 6 is unnecessary as when the pack is placed on the animal the ring 5ʸ will be elongated into an elliptical form, as shown in dotted lines in Fig. 5, and owing to the resiliency of the metal it always tends to assume its original circular form and hence automatically tightens the pack, as conditions may require.

From experience in using this apparatus I have found that it is quicker and more easily applied than those types of pack securing means now in common use. The tightening strap 6 on top of the pack enables one to tighten the pack almost instantly and should the pack become loose while traveling, one could ride up beside the pack-animal and by a single pull on the strap 6, could tighten the ropes without getting off his saddle-animal or loosening the pack.

From the foregoing description, taken in connection with the accompanying drawings, it is thought the complete construction, operation and numerous advantages of my invention will be readily understood by those skilled in the art to which the invention appertains.

What I claim is:

1. A means for lashing packs on animals, comprising a belly-band and ropes connected therewith, together with pairs of sheaves through which said ropes pass, flexible means connecting said sheaves in pairs, and another means for holding the pairs of sheaves together.

2. A means for lashing packs on animals, comprising a belly-band and ropes connected therewith, together with pairs of sheaves through which said ropes pass, flexible means connecting said sheaves in pairs and means connecting said pairs of sheaves whereby the same may be drawn together to tighten the pack.

3. In a means for lashing packs on animals, the combination with the pack securing ropes, of a tightening and equalizing means comprising a series of sheaves arranged in pairs, flexible means connecting said sheaves in pairs, and means connecting said connecting means whereby said connecting means may be drawn closer together to tighten the pack.

4. In a means for lashing packs on animals, the combination with two pack securing ropes, of a tightening and equalizing means comprising four separate pulley blocks or sheaves arranged in pairs through each pair of which a pack rope passes, and flexible means for connecting and drawing on all of said sheaves to tighten the pack.

WHARTON T. MOORE.

Witnesses:
W. E. KAHLER,
S. A. PATTISON.